United States Patent [19]
Krencker et al.

[11] Patent Number: 5,328,264
[45] Date of Patent: Jul. 12, 1994

[54] COMPENSATION DEVICE FOR THE COLD JUNCTION OF A THERMOCOUPLE

[75] Inventors: Patrick Krencker, Bischheim; Jean-Luc Weishaar, Schoenenbourg, both of France

[73] Assignee: Sadis Bruker Spectrospin, Societe Anonyme de Diffusion de L'Instrumentation Scientifique, Bruker Spectrospin, Wissembourg, France

[21] Appl. No.: 21,749

[22] Filed: Feb. 19, 1993

[30] Foreign Application Priority Data

Feb. 21, 1992 [FR] France ............... 92 02199

[51] Int. Cl.$^5$ .............. G01K 7/12; G01K 7/14
[52] U.S. Cl. .................. 374/182; 374/181; 136/222; 136/230
[58] Field of Search ............ 374/181, 182; 136/222, 136/230

[56] References Cited

U.S. PATENT DOCUMENTS

| | | | |
|---|---|---|---|
| 2,836,639 | 5/1958 | Templin | 374/181 |
| 3,109,910 | 11/1963 | Fogleman | 374/181 |
| 3,192,727 | 7/1965 | Ashby et al. | 374/181 |
| 3,280,630 | 10/1966 | Latham, Jr. | 374/181 |
| 3,688,580 | 9/1972 | Jarzembski | 374/182 |
| 3,690,177 | 9/1972 | Fluegel | 374/182 |
| 4,718,777 | 1/1988 | Mydynski et al. | 374/182 |
| 4,936,690 | 6/1990 | Goetzinger | 374/181 |

FOREIGN PATENT DOCUMENTS

| | | |
|---|---|---|
| 2448455 | 12/1975 | Fed. Rep. of Germany . |
| 87083167 | 12/1987 | Fed. Rep. of Germany . |
| 2074968 | 10/1971 | France . |
| 0634120 | 10/1978 | U.S.S.R. ............ 374/182 |
| 2082774 | 3/1982 | United Kingdom ........... 374/181 |

OTHER PUBLICATIONS

"Thermocouple Cold Junction Compensator," Omega-CJ, Product Bulletin 803, Omega Engineering, Inc., Stamford, Conn., (Sep. 1968).
"Thermocouple Reference Junction Compensator," Model JRSP 298, Consolidated Ohmic Devices, Inc., New Hyde Park, N.Y. (Nov. 1965).
"Thermoelement-Vergleichsstellen-Kompensator", vol. 18, No. 11, Nov. 1975, pp. 318-319.

Primary Examiner—Diego F. F. Gutierrez
Attorney, Agent, or Firm—Young & Thompson

[57] ABSTRACT

A cold junction compensation device for a thermocouple, comprising a thermostatically interface casing (1) receiving directly the wires (3, 3') of the thermocouple (2) and ensuring the interconnection of these latter with an extension cord (4). The interface casing (1) contains moreover a cold junction compensation circuit (5).

7 Claims, 2 Drawing Sheets

COMPENSATION DEVICE FOR THE COLD JUNCTION OF A THERMOCOUPLE

FIELD OF THE INVENTION

The present invention relates to measurement techniques and to transmission of the measurement signal, more particularly the measurement of temperatures by means of a thermocouple, and has for its object a compensation device for the cold junction of a thermocouple, adapted particularly to be used in the chamber of a nuclear magnetic resonance spectrometer.

BACKGROUND OF THE INVENTION

At present, various types of thermocouple measurement systems, associated generally with temperature regulation systems, are known and put to use in various applications.

Thus, the regulation of temperature of a sample placed in a magnet of a nuclear magnetic resonance spectrometer is effected by an electronic regulator using a thermocouple for measurement of temperature in the immediate proximity of the specimen.

At the base of the magnet of the spectrometer, the thermocouple wires, surrounded by a shielding sleeve, are connected to an extension cord, called a compensation cable, to transmit the signal to the input of the regulator, often several meters distant.

As a thermocouple is sensitive to temperature differences, the reference junction, called the cold junction, which is to say the junction points between the two conductors of the thermocouple wires and the two copper conductors of the measurement circuit, must be at a known temperature to effect temperature measurement.

One way of proceeding consists in immersing the cold junction in an ice bath. This has the advantage of giving an output voltage of zero for 0° C., rendering the use of a thermocouple table possible.

A more practical method, known as "electronic compensation of cold or junction soldering" consists in adding a compensation voltage to the thermocouple signal so as to avoid the use of a reference junction maintained at a constant temperature (ice or oven).

The known temperature regulator systems are generally provided with a compensation device for the cold junction integrated in their structure, which permits attenuating the measurement errors induced by variations of ambient temperature.

Nevertheless, this internal cold junction compensation of the known regulator systems is relatively imprecise. The maximum precision that can be achieved is at most 5/100ths of a degree per degree of variation of ambient temperature.

Moreover, the junctions between the wires of the thermocouple and the wires of the compensation cable are also sensitive to variations of temperature. Thus, the compensation of the two thermocouple wires, which for example can be respectively copper and constantan, is never exactly identical to that of the two wires of the compensation cable, thereby giving rise to the generation of a disturbing electrical signal which will be added to the usable signal provided by the measuring thermocouple.

There are also known autonomous casings for compensation of the cold junction of a thermocouple.

However, the precision of compensation achieved by these known casings is not superior to that previously indicated, by virtue of the fact particularly of the direct influence of the ambient temperature variations at the connections of the thermocouple wires on said casing by means of connectors.

SUMMARY OF THE INVENTION

The problem solved by the present invention consists in providing a compensation device for the cold junction of a thermocouple in which the influence of ambient temperature variations on the measurement signal is greatly diminished and preferably is less than 5/1000th of a degree per degree of ambient temperature variation, rendering the measurement signal of the thermocouple practically insensible to variations of ambient temperature.

To this end, the present invention has for its object a compensation device for the cold junction of a thermocouple, characterized in that it is principally constituted by a thermostatically controlled interface casing, receiving directly the wires of the thermocouple and ensuring the interconnection of these latter with an extension cord, said interface casing comprising moreover a cold junction compensation circuit.

BRIEF DESCRIPTION OF THE DRAWINGS

The invention will be better understood from the following description, which relates to a preferred embodiment, given by way of non-limiting example, and explained with reference to the accompanying schematic drawings, in which.

BRIEF DESCRIPTION OF THE INVENTION

Figure 1:
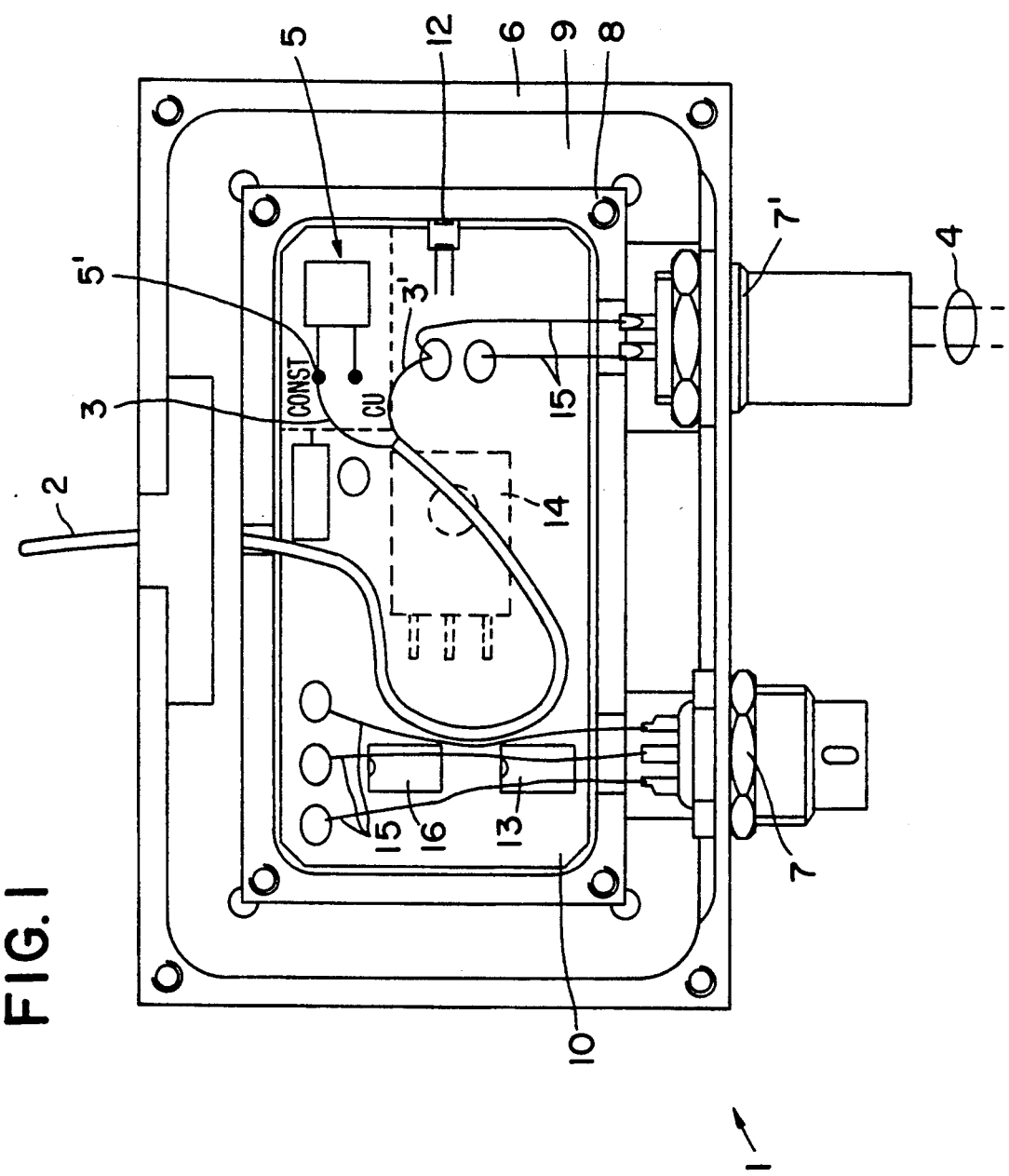
FIG. 1 is a cross-sectional view of the interface casing according to the invention.
Figure 2:
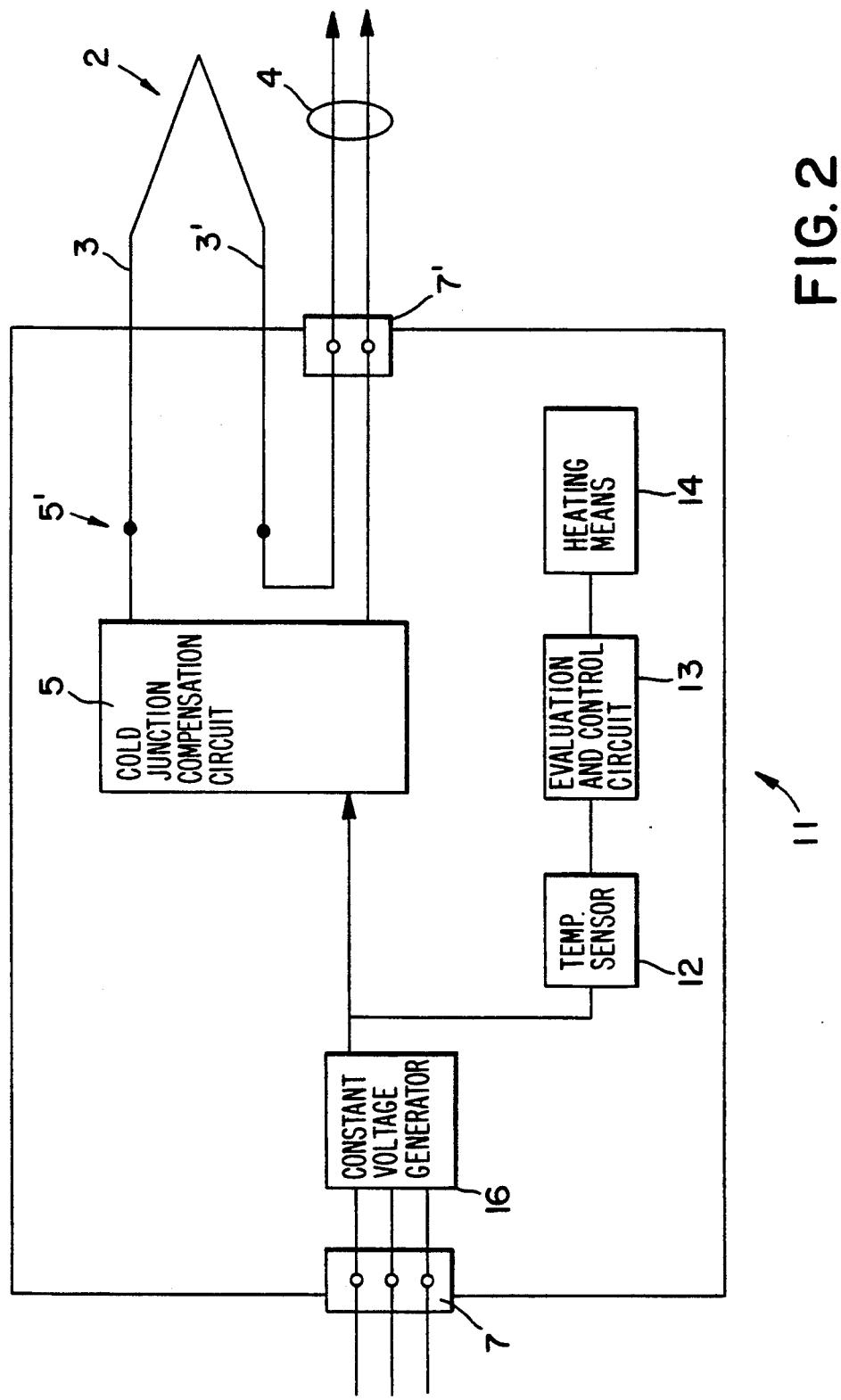
FIG. 2 is a schematic circuit diagram of the compensation device for the cold junction and of the thermal regulation device, disposed in the interface casing shown in FIG. 1, according to a preferred embodiment of the invention.

According to the invention, and as shown in FIGS. 1 and 2 of the accompanying drawings, the cold junction compensation device for a thermocouple is principally constituted by a thermostatically controlled interface casing 1, receiving directly the wires 3, 3' of the thermocouple 2 and ensuring the interconnection of these latter with an extension cord 4, said interface casing 1 comprising also a cold junction compensation circuit 5.

The maintenance of a constant and uniform temperature in the interior of interface casing 1, particularly in the space adjacent the contact point 5', the point generating a voltage error relating to its variations of temperature, whose maximum variations are preferably maintained less than 0.1° C., permits performing by electronic means a very precise cold junction compensation.

To this end, and according to a first characteristic of the invention, the interface casing 1 is constituted on the one hand by an external casing 6 carrying the connectors 7, 7' of the supply cable and of the extension cord 4 and, on the other hand, by an internal casing 8 regulated as to temperature, disposed in said external casing 6 with the interposition of a layer 9 of insulating material and comprising a printed circuit 10 bearing a thermal regulation device 11 and the cold junction compensation circuit 5.

Moreover, so as to limit as much as possible the possibilities of generation of error signals due to connections effected by means of connectors and to thermal shocks transmitted by the wires 3 and 3' of the thermocouple 2, these latter penetrate, over a length, the interior of the internal casing 8, the conductors of said wires 3, 3' being fixed directly to the printed circuit 10.

According to another characteristic of the invention, shown in FIG. 2 of the accompanying drawings, the thermal regulation device 11 is comprised by a temperature sensor 12 associated with an evaluation and control circuit 13 for a heating means 14, said device 11 being adjusted so as to maintain constant the internal temperature of the internal casing 8 at a value higher than ambient temperature.

The temperature sensor 12 mentioned above, could be present in the form of a thermistance integrated to a bridge structure, and is advantageously disposed immediately adjacent the point of contact 5', consisting, for the embodiment shown in FIG. 2, in the connection between the wire 3 of constantan or thermocouple 2, and the printed circuit 10.

As is also shown in FIG. 2 of the accompanying drawings, the compensation circuit 5 can preferably consist of an error signal generator dependent directly on the variation of the temperature of the contact point 5' (thermocouple 2—printed circuit 10) and superposed on the measurement signal from the thermocouple 2, said generator being adjusted as a controlled function of the internal temperature of the thermostatically internal casing 8 and as a function of the type of thermocouple 2.

The printed circuit 10 moreover includes, as shown in FIG. 2 of the accompanying drawings, a constant voltage generator 16, independent of the temperature, supplied by means of connector 7, as well as an adjusting device for the offset of the beginning of measurement, permitting obtaining a measurement signal at the output of interface casing 1, referenced to 0° C.

The constructions of the electronic devices described above and illustrated in FIG. 2 of the accompanying drawings, as well as the choice of suitable components, are within the ordinary skill of a person working in this art and are adapted to be embodied in various practical embodiments.

So as to limit also the influence of thermal shocks which could eventually be carried by the supply cable or the extension cord 4, the connectors 7 and 7' respectively, mounted on the external casing 6, are connected to the corresponding terminals of the printed circuit 10 by means of fine connecting wires 15 of relatively great lengths, thereby avoiding the establishment of thermal bridges between the interior of the interface casing 1 and the exterior adjacent said connectors 7 and 7'.

According to another characteristic of the invention, the connectors for extension cord 4 are of a material identical to that constituting the plugs of the connector 7' and the fine connection wires 15, preferably of copper, minimizing the thermoelectric effects adjacent the connection between the extension cord 4 and the input circuits of the temperature regulator.

So as to permit use of the interface casing 1 immediately adjacent or even in the vicinity of a nuclear magnetic resonance spectrometer, the external casing 6 and, as the case may be, the internal casing 8 are made from a non-magnetic material, preferably of aluminum or aluminum alloy.

The external casing 6, constituting the support envelope of the interface casing 1, can moreover comprise securement means or elements permitting the securement on the structure of the spectrometer itself. Thus, the interface casing 1 having a reduced weight and consequently a small size, can be disposed without difficulty in any emplacement on said spectrometer, particularly on the measuring head of this latter.

Thanks to the invention, it is therefore possible to provide a compensation device for the cold junction of a thermocouple 2, comprising an interface casing 1 of reduced size and all of a piece with said thermocouple 2, the wires 3, 3' of this latter being directly connected to the internal circuits of said interface casing 1.

This last permits, by the cumulative effects of a thermostatization of the internal casing 8 and of a precise electronic compensation of the temperature variations at the point of contact 5', ensuring an independent measurement of the ambient temperature, with precision greater than all the thermocouple measuring devices known by the applicant.

Moreover, the compensation device according to the invention can of course be associated with all types of known thermocouples, particularly by a consequent adaptation of the different electronic components mounted on the printed circuit 10.

Of course, the invention is not limited to the embodiment described and shown in the accompanying drawings. Modifications remain possible, particularly from the point of view of the construction of the various elements or by substitution of technical equivalents, without thereby departing from the scope of protection of the invention.

What is claimed is:

1. Compensation device for the cold junction of a thermocouple, comprising a thermostatically controlled interface casing (1), receiving directly wires (3, 3') of said thermocouple (2) and ensuring the interconnection of said wires with an extension cord (4), said interface casing (1) containing a cold junction compensation circuit (5) for the cold junction of said thermocouple (2), said compensation circuit (5) having an error signal generator, dependent directly on the temperature variation at a contact point (5') of the thermocouple (2) in a printed circuit (10) and superposed on a measurement signal emitted by the thermocouple (2), said generator being adjusted as a function of the internal temperature of the thermostatically controlled internal casing (8) and as a function of the type of thermocouple (2).

2. Compensation device according to claim 1, wherein the interface casing (1) is constituted by an external casing (6) bearing connectors (7, 7') of a supply cable and of the extension cord (4) and by an internal casing (8) adjusted as to temperature, disposed in said external casing (6) with the interposition of a layer (9) of insulating material and containing a printed circuit (10) bearing a thermal regulation device (11) and said cold junction compensation circuit (5).

3. Compensation device according to claim 2, wherein the wires (3, 3') of the thermocouple (2) penetrate into the interior of the internal casing (8), said wires (3, 3') having conductors which are fixed directly into the printed circuit (10).

4. Compensation device according to claim 2, wherein the thermal regulation device (11) is comprised by a temperature sensor (12) associated with an evaluation and control circuit (13) of a heating means (14), said thermal regulation device (11) being so adjusted as to maintain constant the internal temperature of the internal casing (8) at a value greater than the ambient temperature.

5. Compensation device according to claim 2, wherein the connectors (7 and 7') of the supply cable and of the extension cord (4) are connected to corresponding terminals of the printed circuit (10) via connecting wires (15).

6. Compensation device according to claim 5, wherein the extension cord (4) has conductors which are of a material identical to that of the extension cord connector (7') and the connecting wires (15).

7. Compensation device according to claim 2, wherein the external casing (6) and the internal casing (8) are of a non-magnetic material.

* * * * *